(12) United States Patent
Hu et al.

(10) Patent No.: US 11,796,483 B2
(45) Date of Patent: Oct. 24, 2023

(54) DEVICE FOR RECOGNIZING DEFECTS REMAINING IN FINISHED SURFACE OF PRODUCT

(71) Applicant: Fu Tai Hua Industry (Shenzhen) Co., Ltd., Shenzhen (CN)

(72) Inventors: Liu-Bin Hu, Shenzhen (CN); Wei Yang, Shenzhen (CN)

(73) Assignee: Fu Tai Hua Industry (Shenzhen) Co., Ltd., Shenzhen (CN)

( * ) Notice: Subject to any disclaimer, the term of this patent is extended or adjusted under 35 U.S.C. 154(b) by 163 days.

(21) Appl. No.: 17/544,758

(22) Filed: Dec. 7, 2021

(65) Prior Publication Data
US 2022/0373469 A1    Nov. 24, 2022

(30) Foreign Application Priority Data
May 19, 2021   (CN) .......................... 202121073966.X (51) Int. Cl.
*G01N 21/88* (2006.01)
*G06T 7/00* (2017.01)

(52) U.S. Cl.
CPC ..... *G01N 21/8806* (2013.01); *G01N 21/8851* (2013.01); *G06T 7/0006* (2013.01); *G01N 2021/8887* (2013.01); *G06T 2207/30108* (2013.01)

(58) Field of Classification Search
CPC ........... G01N 21/8806; G01N 21/8851; G01N 2021/8887; G06T 7/0006; G06T 2207/30108; G06T 2207/20081; G06T 7/001
See application file for complete search history.

(56) References Cited

U.S. PATENT DOCUMENTS 11,645,742 B2 *  5/2023  Hu ....................... G01N 21/255
                                                                382/141

* cited by examiner

*Primary Examiner* — Hung V Nguyen
(74) *Attorney, Agent, or Firm* — ScienBiziP, P.C.

(57) ABSTRACT

A device to detect defects in a finished surface by analyzing images thereof includes a supporting mechanism, a transmitting mechanism, a detecting mechanism, and a processor. The transmitting mechanism carries and transmits the product. The detecting mechanism includes a detecting frame, and a light source assembly. The processor is used to connect to a camera assembly, and preprocess image obtained of the front of the product to obtain a detection of any defects of the front of the product.

19 Claims, 8 Drawing Sheets

DEVICE FOR RECOGNIZING DEFECTS REMAINING IN FINISHED SURFACE OF PRODUCT

TECHNICAL FIELD

The present disclosure relates to manufacturing.

BACKGROUND

When aluminum alloy is used in electronic products, beneficial characteristics such as malleability, easy processing, light weight, and slow rate of corrosion can be expected. However, during processing, manufacturing, and transportation of products, defects such as scratches, graining, 3D collapse, 3D grinding marks, depressions, burrs, stamped depressions, and cut marks can be easily introduced.

When inspecting the product surface, visual observations by human operators may be used to detect defects on the product surface and determine what types of defects. However, such a detection method has high labor cost and low efficiency.

Therefore, improvement is desired.

DETAILED DESCRIPTION

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

In the description of the present disclosure, it should be understood that the azimuth or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise" and "counterclockwise", is based on the azimuth or positional relationship shown in the attached drawings, which are only for the convenience of describing the present disclosure and simplifying the description, rather than indicating or implying that the device or element must have a specific orientation, or be constructed and operated in a specific orientation, so it cannot be understood as a limitation of the present disclosure.

The terms "first" and "second" are only used for descriptive purposes and cannot be understood as indicating or implying relative importance or implicitly indicating the number of indicated technical features. Thus, the features defining "first" and "second" may explicitly or implicitly include one or more of the features. In the description of the present disclosure, "multiple" means two or more, unless otherwise expressly and specifically defined.

In the description of the present disclosure, it should be noted that, unless otherwise clearly specified and limited, the terms "install", "connect" and "connection" should be understood in a broad sense, for example, it can be fixed connection, removable connection, or integrated connection. It can be mechanical connection, electrical connection or duplex communication. It can be directly connected or indirectly connected through an intermediate medium. It can be a connection within two elements or the interaction relationship between two elements.

In the present disclosure, unless otherwise expressly provided and limited, the first feature "above" or "below" of the second feature may include direct contact between the first and second features, or the first and second features may not be in direct contact, but through another feature contact between them. Moreover, if the first feature is "above", "above" and "above" of the second feature, this may include the first feature being directly above and obliquely above the second feature, or only indicating that the horizontal height of the first feature is higher than the second feature. If the first feature is "below", "below" and "below" of the second feature, this may include the first feature being directly above and obliquely above the second feature, or only indicating that the horizontal height of the first feature is less than that of the second feature.

The following disclosure provides many different embodiments or examples to implement different structures of the present application. In order to simplify the disclosure of the present application, the components and settings of specific examples are described below. These are merely examples and are not intended to limit the present application. In addition, the present application may repeat reference numbers and reference letters in different examples for the purpose of simplification and clarity, which itself does not indicate a relationship between the various embodiments and settings discussed.

Figure 1:
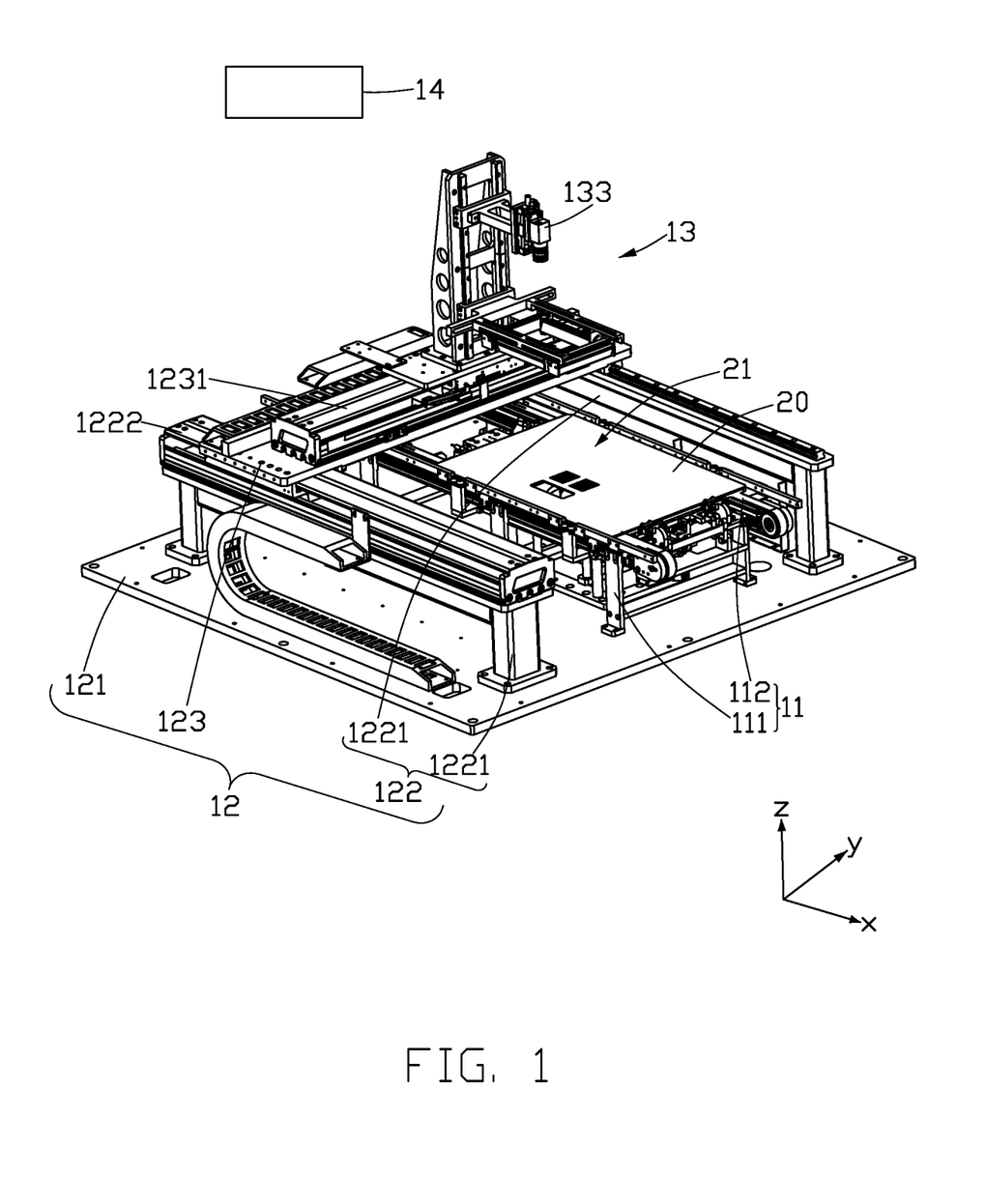
FIG. 1 is a schematic diagram of a detecting device according to an embodiment of the present disclosure.

FIG. 1 illustrates a detecting device 10 in accordance with an embodiment of the present disclosure.

The detecting device 10 is used to detect scratches, lines in materials, 3D collapses, 3D grinding marks, depressions, burrs, stamping depressions, knife and cut marks, and other defects which are on a front 21 of a product 20. The product 20 has a square structure, a length direction of the product 20 arranged on the detecting device 10 is defined as a first direction, a width direction of the product 20 is defined as a second direction, and the second direction is perpendicular to the first direction. The product 20 can be an electronic device, such as mobile phone or tablet. When in use, the uppermost side of product 20 is the front 21 of the product 20.

Figure 2:
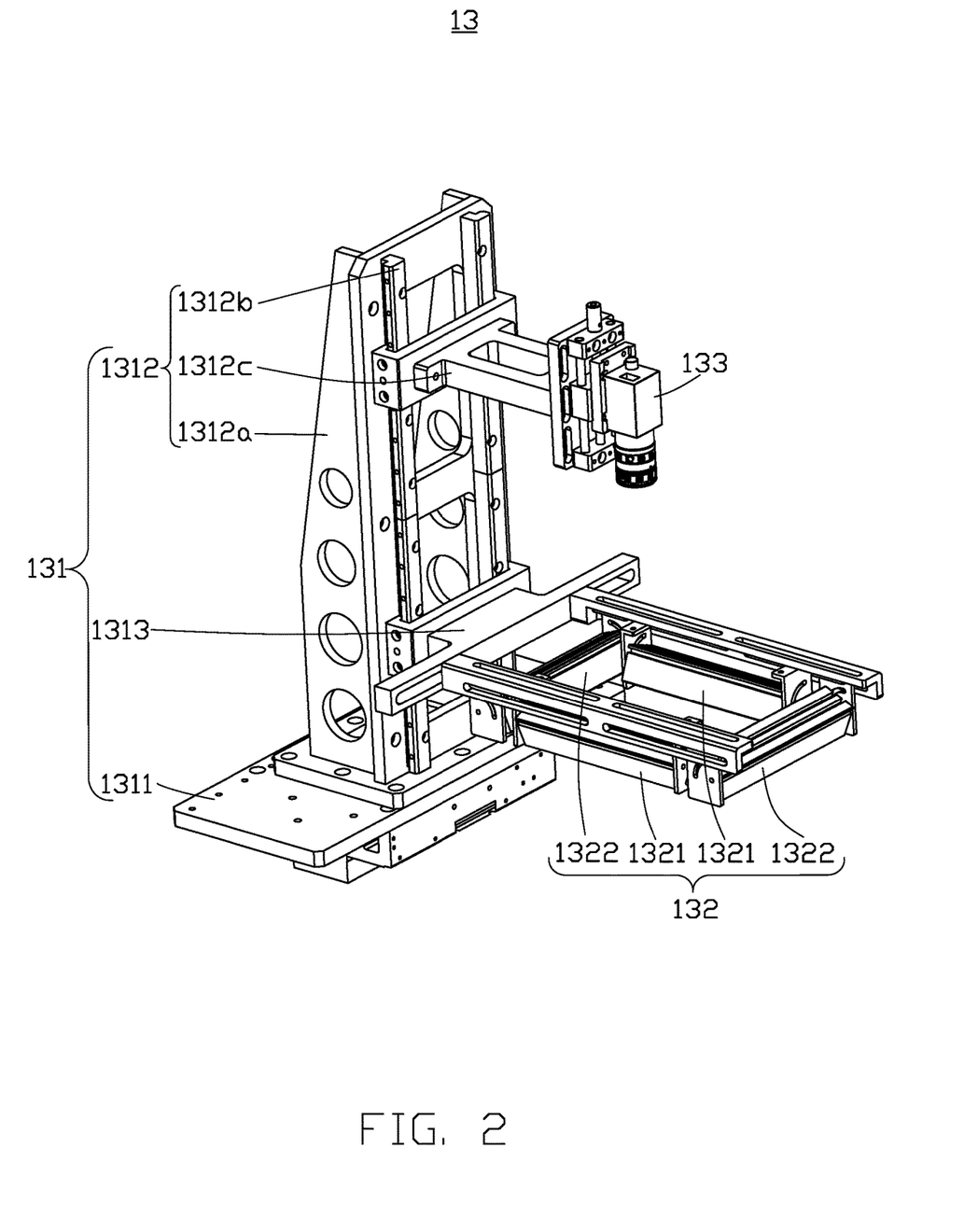
FIG. 2 is a schematic diagram of a detecting mechanism according to an embodiment of the present disclosure.

Referring to FIG. 2, the detecting device 10 includes a transmitting mechanism 11, a supporting mechanism 12, a detecting mechanism 13, and a processor 14. The transmitting mechanism 11 is used to carry and transmit the product 20. The transmitting mechanism 11 is arranged on the supporting mechanism 12. The detecting mechanism 13 includes a detecting frame 131, a light source assembly 132, and a camera assembly 133. The detecting frame 131 is arranged on the supporting mechanism 12 to move in the first direction and the second direction, and the light source assembly 132 is connected to the detecting frame 131. The light source assembly 132 includes two red light strips 1321 and two white light strips 1322. The included angle between the light emitted by the two red light strips 1321 and the front 21 of the product 20 is an acute angle. The included angle between the white light strip 1322 and the front 21 of the product 20 is an acute angle, and the two red light strips 1321 are arranged along the first direction. The two white light strips 1322 are arranged along the second direction. The camera assembly 133 is connected to the detecting frame 131. The image taking direction of the camera assembly 133 is perpendicular to the front 21 of the product 20, and the camera assembly 133 is used to obtain an image of the product 20 under the light of the light source assembly 132. The processor 14 is connected to the camera assembly 133, and the processor 14 is used to process the image of the product 20 to analyze the front 21 of the product 20. The camera assembly 133 can be an array of cameras.

The detecting device 10 uses the camera assembly 133 to obtain the image of the front 21 of the product 20 under the two red light strips 1321 and the two white light strips 1322. The detecting device 10 processes the obtained image through the processor 14. Therefore, the detecting device 10 uses the camera assembly 133 to cooperate with two red light strips 1321 and two white light strips 1322, to obtain the image of the front 21 of the product 20, and uses the processor 14 to automatically identify defects, which improves the accuracy of analysis and saves labor cost.

The above processing of the image obtained by the processor 14 refers to comparing the obtained image with the standard image of a perfect product prestored in the processor 14, by using the discrimination model in the processor to determine defects such as scratches, material lines, 3D collapse, 3D grinding marks, depressions, burrs, stamping depressions, knife marks, and other defects revealed in the image. The formation process of the discrimination model is roughly as follows: train the computer to learn the scratches, material lines, 3D collapse, 3D grinding marks, depressions, burrs, stamping depressions, knife marks and other defects on the front 21 of the product 20 (for example, features showing defects revealed in an image), establish a learning model for the learned content, and form the learned image information into a standard image library stored in the processor 14, and a discrimination model for determining positive defects of products, established according to the standard image database. The processor 14 may be a microcomputer.

In one embodiment, the processor 14 may be a microcomputer with the functions of calculating and storing images, and the processor 14 may be connected to external devices to cooperate with the detecting device 10 to complete the corresponding work.

In one embodiment, the supporting mechanism 12 includes a supporting platform 121, a supporting frame 122, and a moving member 123. The transmitting mechanism 11 is arranged on the supporting platform 121. The supporting frame 122 is connected to the supporting platform 121, and the supporting frame 122 includes two gantry carriages 1221 arranged symmetrically. The two gantry carriages 1221 extend along the first direction, and each gantry carriage 1221 is provided with a first guiding rail 1222. The moving member 123 is slidably connected to the first guiding rail 1222, the moving member 123 is provided with a second guiding rail 1231 arranged along the second direction, and the detecting frame 131 is slidably connected to the second guiding rail 1231.

The supporting platform 121 can be connected to an external device to cooperate with the detecting device 10 to complete the operation.

In one embodiment, the transmitting mechanism 11 includes a transmitting bracket 111 and a transmitting belt 112. The transmitting bracket 111 is arranged on the supporting platform 121 and is located between two gantry carriages 1221. After the product 20 is placed on the transmitting belt 112, the length direction of the product 20 is consistent with the transmission direction of the transmitting belt 112. The transmitting bracket 111 and the transmitting belt 112 can be extended on the supporting platform 121 according to the actual needs to adapt to the external device and cooperate with the detecting device 10 to complete the operation.

In one embodiment, the detecting frame 131 includes a fixing plate 1311, a first detecting rack 1312, and a second detecting rack 1313. The first detecting rack 1312 is connected to the fixing plate 1311, and the camera assembly 133 is connected to the first detecting rack 1312. The second detecting rack 1313 is slidably connected with the first detecting rack 1312 along the third direction, the light source assembly 132 is connected to the second detecting rack 1313, the third direction, the first direction, and the second direction being perpendicular to each other. The first detecting rack 1312 includes a first detecting rod 1312a, a detecting track 1312b, and an adjusting block 1312c. One end of the first detecting rod 1312a is connected to the fixing plate 1311, the detecting track 1312b is fixedly connected to the first detecting rod 1312a, and the length direction of the detecting track 1312b is arranged along the third direction. One end of the adjusting block 1312c is slidably connected to the detecting track 1312b, and the other end of the adjusting block 1312c is connected to the camera assembly 133, wherein the third direction, the first direction, and the second direction are perpendicular to each other.

The second detecting rack 1313 is slidably connected with the detecting track 1312b in a hollow rectangular structure. Two red light strips 1321 and two white light strips 1322 are arranged on the second detecting rack 1313, and the two red light strips 1321 are symmetrically arranged. The two white light strips 1322 are also symmetrically arranged.

The first direction is the extension direction of the first guiding rail 1222, that is the X axis in FIG. 1, the second direction is the extension direction of the second guiding rail 1231, that is the Y axis in FIG. 1, and the third direction is the extension direction of the detecting track 1312b, that is the Z axis in FIG. 1.

Figure 3:
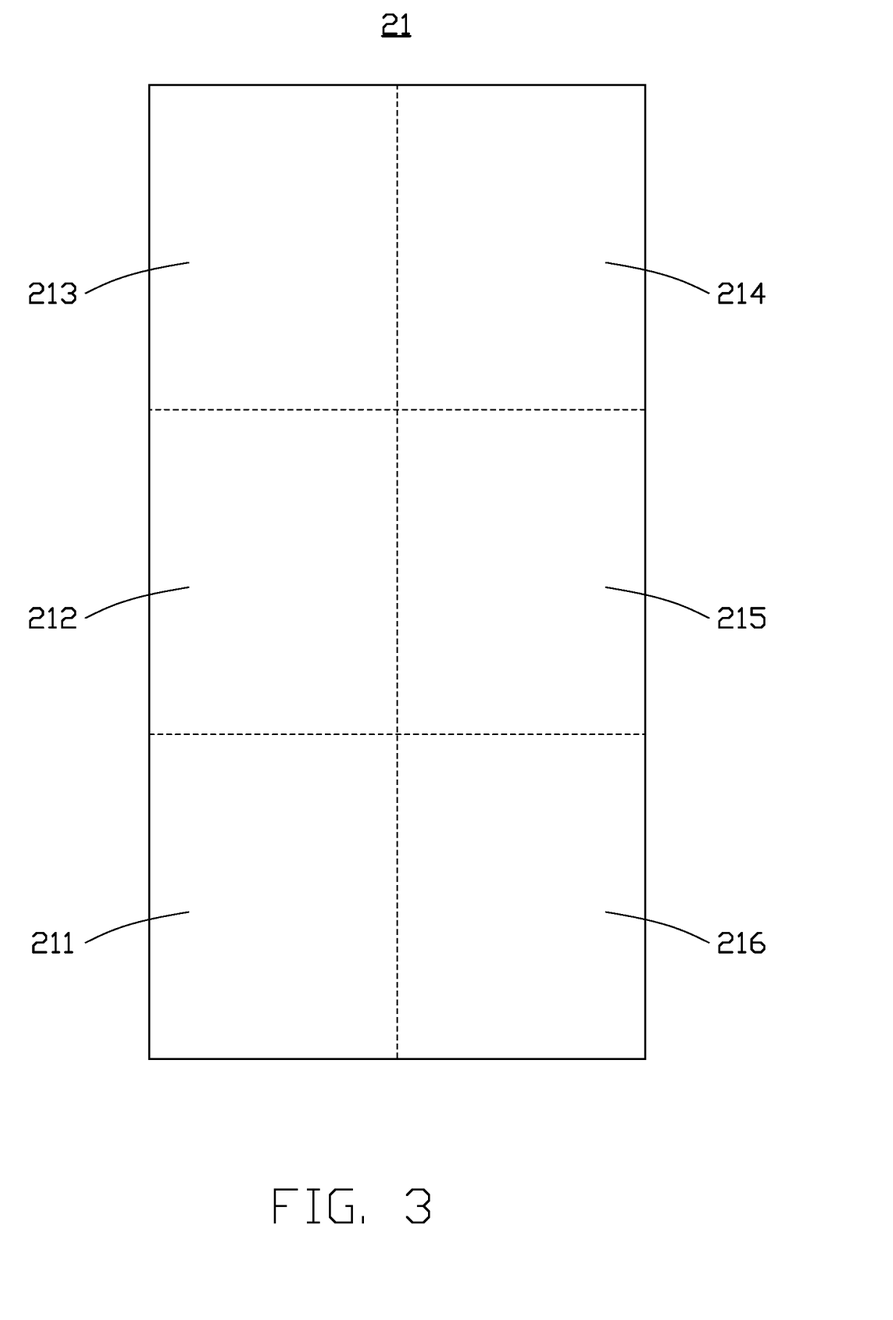
FIG. 3 is a schematic diagram of a division of the front of a product into areas, in one embodiment of the present disclosure.

Referring to FIG. 3, when the front 21 of the product 20 is detected by the detecting device 10, the front 21 is divided into a first front 211, a second front 212, a third front 213, a fourth front 214, a fifth front 215, and a sixth front 216, as FIG. 3 shows. The first front 211, the second front 212, and the third front 213 are arranged along the length direction of the product 20, and the first front 211 and the sixth front 216 are arranged along the width direction of the product 20.

In another embodiment, the front 21 can also be divided into other areas.

Figure 4:
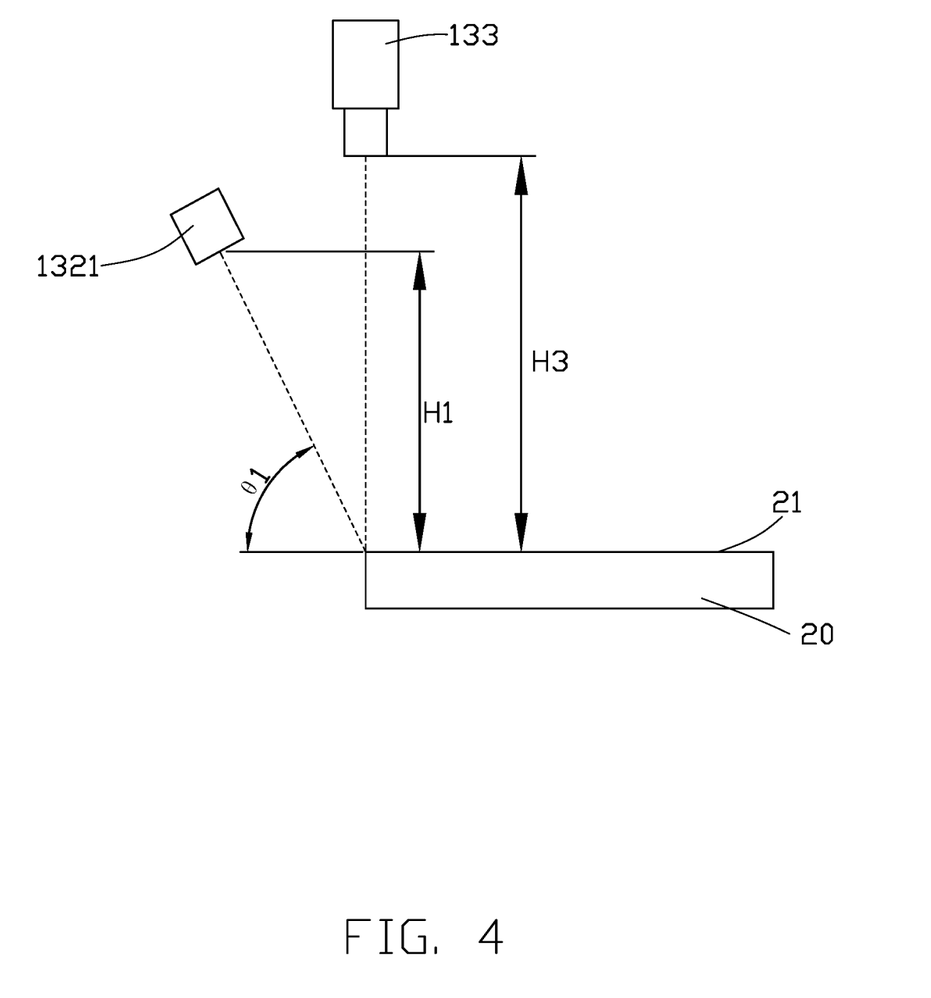
FIG. 4 is a schematic diagram of a red light strip in a first state, a camera assembly, and the product, in an embodiment of the present disclosure.
Figure 5:
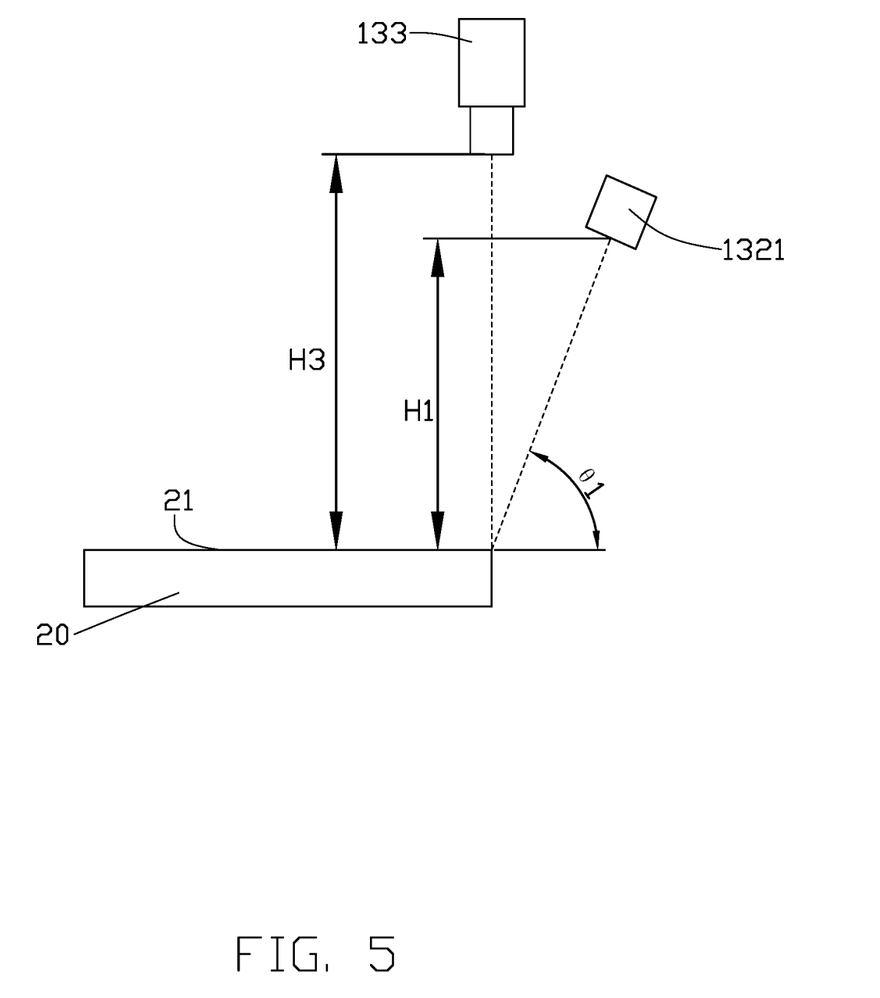
FIG. 5 is a schematic diagram of a red light strip in a second state, a camera assembly, and the product, in another embodiment of the present disclosure.

Referring to FIG. 4 and FIG. 5, in one embodiment, the detecting device 10 satisfies the relationship: $30° < \theta1 < 60°$.

θ1 is the included angle between the light emitted by each red light strip 1321 and the front 21 of the product 20, and θ1 can be 40° and 50°.

In one embodiment, the detecting device 10 satisfies the relationship H1=(0.4–0.8)*[(a+b)/2].

H1 is the distance from each red light strip 1321 along the third direction to the front 21 of the product 20, a is the length of the product 20, and b is the width of the product 20.

In the embodiment, the distance and included angle between the red light strip 1321 in the detecting mechanism 13 and the front 21 of the product 20 are configured to achieve a better image.

The detecting device 10 satisfies the relationship H3= (0.7~1.7)*[(a+b)/2].

H3 is the distance from the camera assembly 133 along the third direction to the front 21 of the product 20, a is the length of the product 20, and B is the width of the product 20.

In the embodiment, the distance between the camera assembly 133 in the detecting mechanism 13 and the front 21 of the product 20 is configured to achieve a better result by the camera assembly.

Referring to FIG. 3 to FIG. 5, during detection, the moving member 123 is driven to move on the first guiding rail 1222 manually or through powered components (such as cylinder or motor), so that the light emitted by the two red light strips 1321 covers the first front 211 and the third front 213. At this time, the images of the first front 211 and the third front 213 in the front 21 are obtained through the camera assembly 133. The first detecting rack 1312 is driven manually or through the powered components to drive the fixing plate 1311 to slide on the second guiding rail 1231, so that the light emitted by the two red light strips 1321 covers the fourth front 214 and the sixth front 216. At this time, the images of the fourth front 214 and the sixth front 216 in the front 21 are obtained through the camera assembly 133.

In this way, the images of the first front 211, the third front 213, the fourth front 214, and the sixth front 216 form an image, and the processor 14 preprocesses the obtained image obtained to determine the existence of defects such as edge collapse, and scratches in the front 21.

In another embodiment, the order in which the images of the first front 211, the third front 213, the fourth front 214, and the sixth front 216 are obtained can be changed. As long as the camera assembly 133 can obtain an image when the light emitted by the two red light strips 1321 covers the front part.

Figure 6:
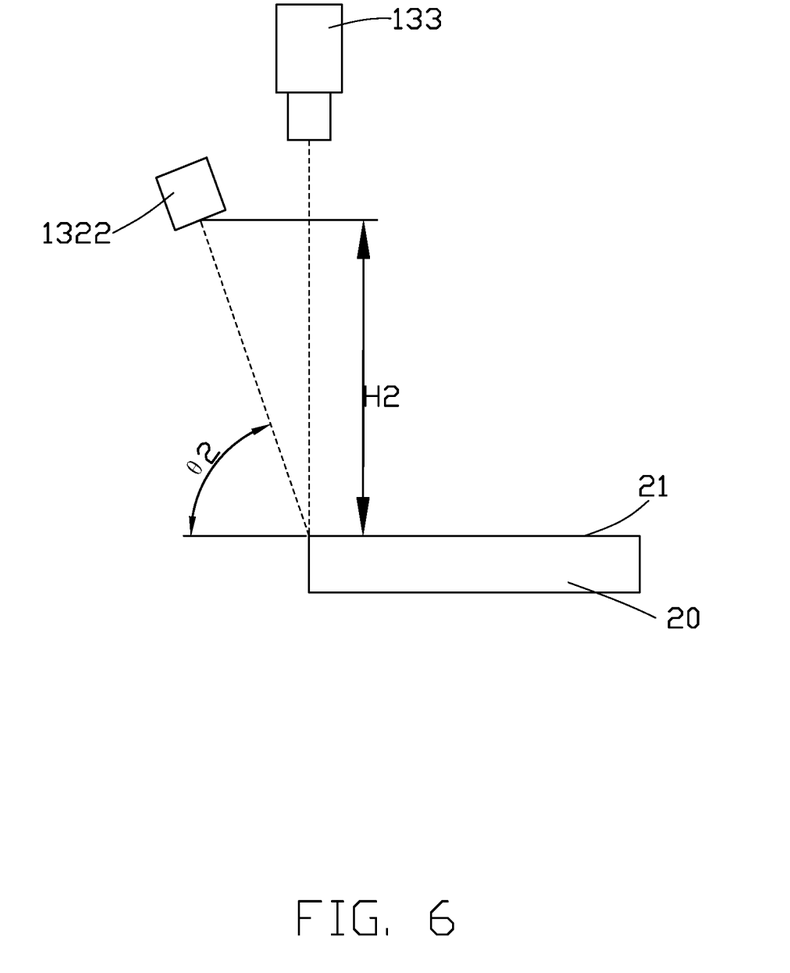
FIG. 6 is a schematic diagram of a white light strip in a first state, a camera assembly, and the product, in an embodiment of the present disclosure.
Figure 7:
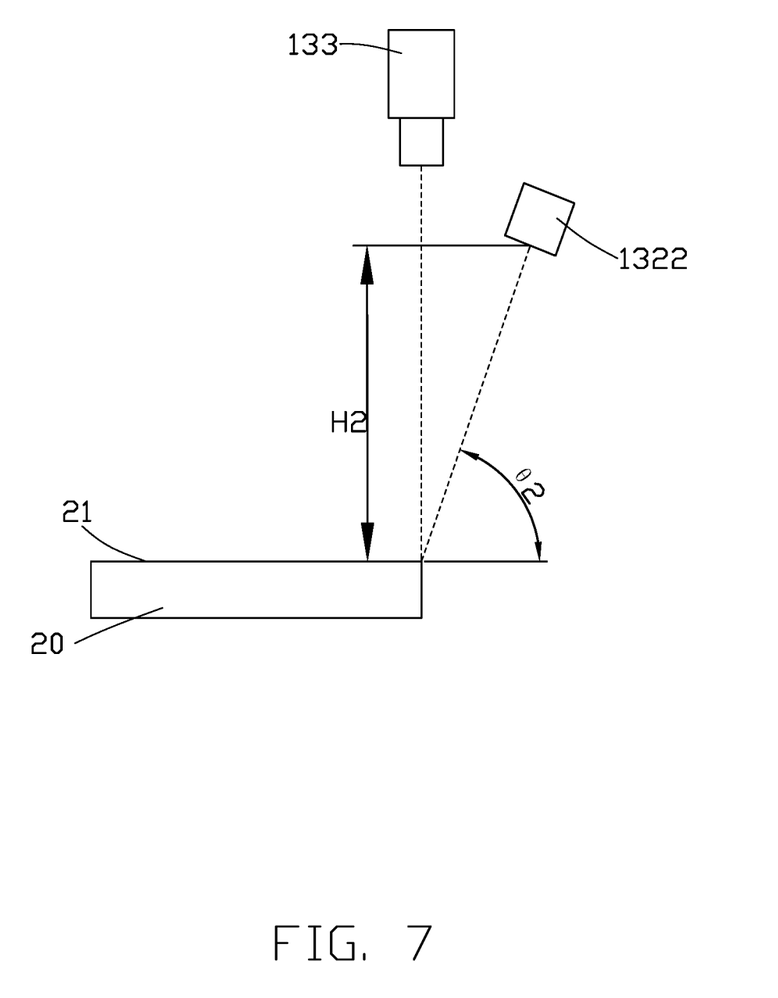
FIG. 7 is a schematic diagram of a white light strip in a second state, a camera assembly, and the product, in another embodiment of the present disclosure.

Referring to FIG. 6 and FIG. 7, in one embodiment, the detecting device 10 satisfies the relationship: 30°<θ2<60°.

θ2 is the included angle between the light emitted by the white light strips 1322 and the front 21 of the product 20, and θ2 can be 40° or 50°

In one embodiment, the detecting device 10 satisfies the relationship H2=(0.4–0.8)*[(a+b)/2].

H2 is the distance from each white light strip 1322 along the third direction to the front 21 of the product 20, a is the length of the product 20, and b is the width of the product 20.

In the embodiment, the distance between the white light strips 1322 in the detecting mechanism 13 and the front 21 of the product 20 and the included angle are configured to achieve a better image.

Figure 8:
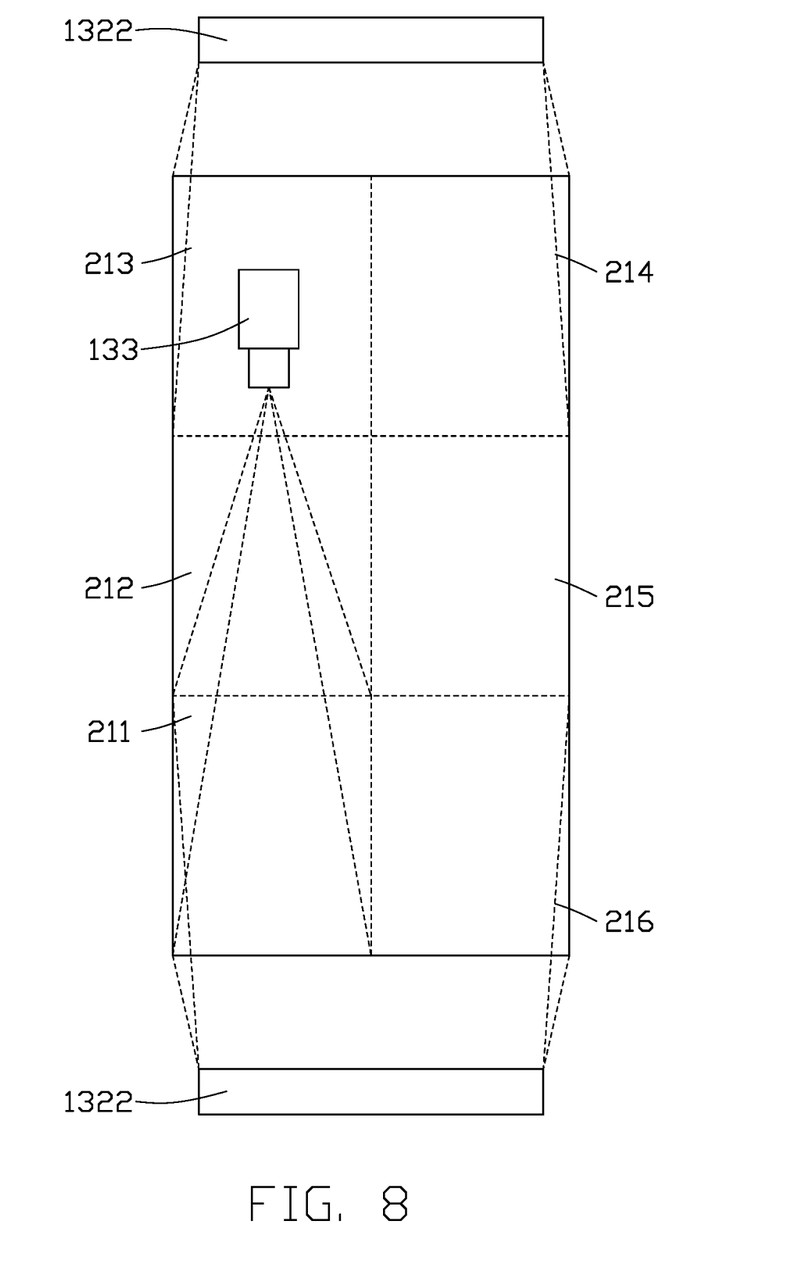
FIG. 8 is a schematic diagram of a white light strip in a third state, a camera assembly, and the product, in another embodiment of the present disclosure.

Referring to FIG. 8, during detection, the moving member 123 is driven to move in the positive direction on the first guiding rail 1222 manually or through the powered components so that the light emitted by the two white light strips 1322 covers the first front 211, the second front 212, and the third front 213. The first detecting rack 1312 is driven manually or through the powered components to drive the fixing plate 1311 to slide on the second guiding rail 1231, so that the light emitted by the two white light strips 1322 is transferred from the third front 213 to the fourth front 214. Manually or through the powered components the moving member 123 is moved in the opposite direction on the first guiding rail 1222, so that the light emitted by the two white light strips 1322 covers the fifth front 215 and the sixth front 216. In this process, images of the first front 211, the second front 212, the third front 213, the fourth front 214, the fifth front 215, and the sixth front 216 in the front 21 are obtained by using the camera assembly 133.

In this way, the obtained images of the first front 211, the second front 212, the third front 213, the fourth front 214, the fifth front 215, and the sixth front 216 form an image, and the processor 14 processes the obtained image to determine the presence of defects such as material lines, 3D grinding marks, depressions, burrs, stamping depressions, knife marks and other defect on the front 21.

Those of ordinary skill in the art should realize that the above embodiments are only used to illustrate the present disclosure, but not to limit the present disclosure. As long as they are within the essential spirit of the present disclosure, the above embodiments are appropriately made. Changes and modifications are to fall within the scope of protection of the present disclosure.

What is claimed is:

1. A detecting device of detecting a surface of a product, the detecting device comprising:
    a supporting mechanism;
    a transmitting mechanism carrying and transmitting the product; wherein the transmitting mechanism is arranged on the supporting mechanism, and an upward side of the product is a front of the product;
    a detecting mechanism comprising a detecting frame, a light source assembly, and a camera assembly, and wherein length direction of the product arranged on the detecting device is defined as a first direction, width direction of the product is defined as a second direction, and the second direction is perpendicular to the first direction; wherein the detecting frame is arranged on the supporting mechanism to move along the first direction and the second direction, the light source assembly is connected to the detecting frame; the light source assembly comprises two red light strips and two white light strips, an included angle between light emitted by the two red light strips and the front of the product is an acute angle, and the included angle between the two white light strips and the front of the product is an acute angle, the two red light strips are arranged along the first direction, and the two white light strips are arranged along the second direction, the camera assembly is connected to the detecting frame; wherein and an image capturing direction of the camera assembly is perpendicular to the front of the product, and the camera assembly obtains an image of the front of the product under the light of the light source assembly; and
    a processor connecting to the camera assembly and preprocessing the image of the front of the product, to obtain a detection result of the front of the product.

2. The detecting device of claim 1, wherein:
    the detecting device satisfies a relationship of 30°<θ1<60°;

wherein θ1 is the included angle between the light emitted by each of the two red light strips and the front of the product.

3. The detecting device of claim 1, wherein:
the detecting device satisfies a relationship of 30°<θ2<60°;
wherein θ2 is the included angle between the light emitted by the white light strip and the front of the product.

4. The detecting device of claim 1, wherein:
the detecting device satisfies a relationship of H1= (0.4~0.8)*[(a+b)/2];
wherein H1 is a distance from each of the two red light strips in the third direction to the front of the product, the third direction is perpendicular to the front of the product, a is a length of the product, and b is a width of the product.

5. The detecting device of claim 4, wherein:
the detecting device satisfies the relationship of H2= (0.4~0.8)*[(a+b)/2];
wherein H2 is a distance from each of the white light strip in the third direction to the front of the product, a is the length of the product, and b is the width of the product.

6. The detecting device of claim 5, wherein:
the detecting device satisfies the relationship of H3= (0.7~1.7)*[(a+b)/2];
wherein H3 is a distance from the camera assembly in the third direction to the front of the product, a is the length of the product, and b is the width of the product.

7. The detecting device of claim 1, wherein:
the supporting mechanism comprises a supporting platform, a supporting frame, and a moving member, the transmitting mechanism is arranged on the supporting platform, the supporting frame is connected to the supporting platform, the supporting frame comprises a first guiding rail, and the first guiding rail is parallel to the first direction; the moving member is connected to the first guiding rail, the moving member comprises a second guiding rail, the second guiding rail is parallel to the second direction, the detecting frame is connecting to the second guiding rail.

8. The detecting device of claim 7, wherein:
the detecting frame comprises a fixing plate, a first detecting rack, and a second detecting rack; the fixing plate is connected to the second guiding rail, the first detecting rack is connected to the fixing plate, the camera assembly is connected to the first detecting rack, the second detecting frame is slidably connected with the first detecting rack along the third direction, the light source assembly is connected to the second detecting rack, and the third direction, the first direction and the second direction are perpendicular to each other.

9. The detecting device of claim 8, wherein:
the first detecting rack comprises a first detecting rod, a detecting track and an adjusting block, the first detecting rod is connected to the fixing plate, the detecting track is connected to the first detecting rod, an extension direction of the detecting track is parallel to the third direction, a first end of the adjusting block is slidably connected to the detecting track, a second end of the adjusting block is connected to the camera assembly.

10. The detecting device of claim 8, wherein: the transmitting mechanism comprises a transmitting bracket, and the transmitting bracket is arranged on the supporting platform and is located between two gantry carriages.

11. A detecting device for detecting a surface of a product, the detecting device comprising:
a supporting mechanism;
a transmitting mechanism carrying and transmitting the product; wherein the transmitting mechanism is arranged on the supporting mechanism, and an upward side of the product is a front of the product;
a detecting mechanism comprising a detecting frame, a light source assembly, and a camera assembly, and wherein length direction of the product arranged on the detecting device is defined as a first direction, width direction of the product is defined as a second direction, and the second direction is perpendicular to the first direction; wherein the detecting frame is arranged on the supporting mechanism to move along the first direction and the second direction, the light source assembly is connected to the detecting frame; the light source assembly comprises two red light strips and two white light strips, an included angle between light emitted by the two red light strips and the front of the product is an acute angle, and the included angle between the two white light strips and the front of the product is an acute angle, the two red light strips are arranged along the first direction, and the two white light strips are arranged along the second direction, the camera assembly is connected to the detecting frame; wherein and an image capturing direction of the camera assembly is perpendicular to the front of the product, and the camera assembly obtains an image of the front of the product under the light of the light source assembly; and
a processor connecting to the camera assembly and pre-processing the image of the front of the product, to obtain a detection result of the front of the product;
wherein the supporting mechanism comprises a supporting platform, a supporting frame, and a moving member, the transmitting mechanism is arranged on the supporting platform, the supporting frame is connected to the supporting platform, the supporting frame comprises a first guiding rail, and the first guiding rail is parallel to the first direction; the moving member is connected to the first guiding rail, the moving member comprises a second guiding rail, the second guiding rail is parallel to the second direction, the detecting frame is connecting to the second guiding rail.

12. The detecting device of claim 11, wherein:
the detecting device satisfies a relationship of 30°<θ1<60°;
wherein θ1 is the included angle between the light emitted by each of the two red light strips and the front of the product.

13. The detecting device of claim 12, wherein:
the detecting device satisfies a relationship of 30°<θ2<60°;
wherein θ2 is the included angle between the light emitted by the white light strip and the front of the product.

14. The detecting device of claim 11, wherein:
the detecting device satisfies a relationship of H1= (0.4~0.8)*[(a+b)/2];
wherein H1 is a distance from each of the two red light strips in the third direction to the front of the product, the third direction is perpendicular to the front of the product, a is a length of the product, and b is a width of the product.

15. The detecting device of claim 14, wherein:
the detecting device satisfies the relationship of H2= (0.4~0.8)*[(a+b)/2];

wherein H2 is a distance from each of the white light strip in the third direction to the front of the product, a is the length of the product, and b is the width of the product.

16. The detecting device of claim 15, wherein:
the detecting device satisfies the relationship of H3= (0.7~1.7)*[(a+b)/2];
wherein H3 is a distance from the camera assembly in the third direction to the front of the product, a is the length of the product, and b is the width of the product.

17. The detecting device of claim 11, wherein:
the detecting frame comprises a fixing plate, a first detecting rack, and a second detecting rack; the fixing plate is connected to the second guiding rail, the first detecting rack is connected to the fixing plate, the camera assembly is connected to the first detecting rack, the second detecting frame is slidably connected with the first detecting rack along the third direction, the light source assembly is connected to the second detecting rack, and the third direction, the first direction and the second direction are perpendicular to each other.

18. The detecting device of claim 17, wherein:
the first detecting rack comprises a first detecting rod, a detecting track and an adjusting block, the first detecting rod is connected to the fixing plate, the detecting track is connected to the first detecting rod, an extension direction of the detecting track is parallel to the third direction, a first end of the adjusting block is slidably connected to the detecting track, a second end of the adjusting block is connected to the camera assembly.

19. The detecting device of claim 17, wherein: the transmitting mechanism comprises a transmitting bracket, and the transmitting bracket is arranged on the supporting platform and is located between two gantry carriages.

* * * * *